United States Patent
Chiu et al.

(10) Patent No.: US 11,251,697 B1
(45) Date of Patent: Feb. 15, 2022

(54) POWER CONVERTING DEVICE FOR POWER SUPPLY

(71) Applicants: MICRO-STAR INT'L CO., LTD., New Taipei (TW); MSI COMPUTER (SHENZHEN) CO., LTD., Shenzhen (CN)

(72) Inventors: Kai-Chieh Chiu, Chiayi County (TW); Ming-Chih Lo, New Taipei (TW); Chung-Hsing Chang, New Taipei (TW)

(73) Assignees: MICRO-STAR INT'L CO., LTD., New Taipei (TW); MSI COMPUTER (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/153,743

(22) Filed: Jan. 20, 2021

(30) Foreign Application Priority Data

Dec. 2, 2020 (TW) .............................. 109215925

(51) Int. Cl.
| | |
|---|---|
| *H02M 3/157* | (2006.01) |
| *H02M 1/32* | (2007.01) |
| *H02H 9/04* | (2006.01) |
| *H02M 1/42* | (2007.01) |
| *H02M 1/00* | (2006.01) |

(52) U.S. Cl.
CPC .......... *H02M 1/4225* (2013.01); *H02H 9/046* (2013.01); *H02M 1/32* (2013.01); *H02M 3/157* (2013.01); *H02M 1/0032* (2021.05)

(58) Field of Classification Search
CPC ...... H02M 3/003; H02M 3/156; H02M 3/157; H02M 1/32; H02M 1/0032; H02H 9/46; H02H 9/046
See application file for complete search history.

(56) References Cited

U.S. PATENT DOCUMENTS

| | | | |
|---|---|---|---|
| 7,774,633 B1* | 8/2010 | Harrenstien | G06F 1/24 |
| | | | 713/323 |
| 2004/0189341 A1* | 9/2004 | Liu | G06F 1/26 |
| | | | 324/750.3 |
| 2007/0139018 A1* | 6/2007 | Mentelos | H02J 9/061 |
| | | | 320/166 |
| 2010/0301908 A1* | 12/2010 | Chen | G06F 1/26 |
| | | | 327/143 |

\* cited by examiner

*Primary Examiner* — Gary L Laxton
(74) *Attorney, Agent, or Firm* — Maschoff Brennan

(57) ABSTRACT

A power converting device for power supply comprises an input port, a voltage boost circuit and an output port. Input port has an input standby pin configured to transmit a first power signal having a first voltage value and an input power pin configured to transmit a second power signal having a second voltage value. Voltage boost circuit electrically connecting to the input standby pin and receives and converts the first power signal having the first voltage value into the first power signal having the second voltage value. Output port has an output standby pin electrically connecting to the voltage boost circuit to receive the first power signal having the second voltage value and an output power pin electrically connecting to the input power pin to receive the second power signal having the second voltage value, wherein the second voltage value is higher than the first voltage value.

7 Claims, 2 Drawing Sheets

POWER CONVERTING DEVICE FOR POWER SUPPLY

CROSS-REFERENCE TO RELATED APPLICATIONS

This non-provisional application claims priority under 35 U.S.C. § 119(a) on Patent Application No(s). 109215925 filed in Taiwan, R.O.C. on Dec. 12, 2020, the entire contents of which are hereby incorporated by reference.

BACKGROUND

1. Technical Field

This disclosure relates to a power converting device, more specifically to a power converting device for boosting the voltage of power supply.

2. Related Art

It has been 25 years since Intel announced and developed interconnects of power supply under the standard of advanced technology extended (ATX) in 1995. Currently the power supply under the standard of ATX12V has a plurality of main voltage channel, such as 3.3V, 5V, 5VSB(standby), 12V, −12V, and other voltage. The +5VSB channel independent from the +5V power channel provides the power needed when the computer is standing by. As long as the AC power source is not cut off, the +5VSB still provides low-power DC power under the circumstances that other voltage channels are cut off even if the computer is off.

However, as the request of saving energy from the laws and regulations of energy conservation from Energy Star, California Energy Commission or the like are more and more strict, providing various voltage outputs no longer meets the requirements of the modern energy conservation design, e.g., Microsoft Modern Standby, and such also impacts the conversion efficiency of the power supply. Intel has published a ATX12VO design guide in which a power supply only outputs voltage of +12V, eliminating the plurality of other voltage output such as 3.3V, 5V, SVSB and the like in the past. Besides the applied voltage value, the number of pins is also different.

However, the standard of ATX12VO is not yet in the market-mainstream currently, and most of manufacturers merely release the samples in public, with most of the product circulating in the market still adapting the standard of ATX12V. For the above reasons, to customers' viewpoint, customers are not willing to purchase hardware adapting new standard since most of the hardware has not fully supported the new standard and thus results in doubt of applicability thereof when buying additional equipment. Thus, a converting device in the market is needed for hardware of the ATX12V standard may also be adapted to the ATX12VO standard.

SUMMARY

According to one or more embodiment of this disclosure, a power converting device for power supply comprises: an input port having an input standby pin and an input power pin with the input standby pin configured to transmit a first power signal having a first voltage value and the input power pin configured to transmit a second power signal having a second voltage value; a voltage boost circuit, electrically connecting to the input standby pin, receiving and converting the first power signal having the first voltage value into the first power signal having the second voltage value; and an output port having an output standby pin and an output power pin with the output standby pin electrically connecting to the voltage boost circuit to receive the first power signal having the second voltage value, and with the output power pin electrically connecting to the input power pin to receive the second power signal having the second voltage value, wherein the second voltage value is higher than the first voltage value.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
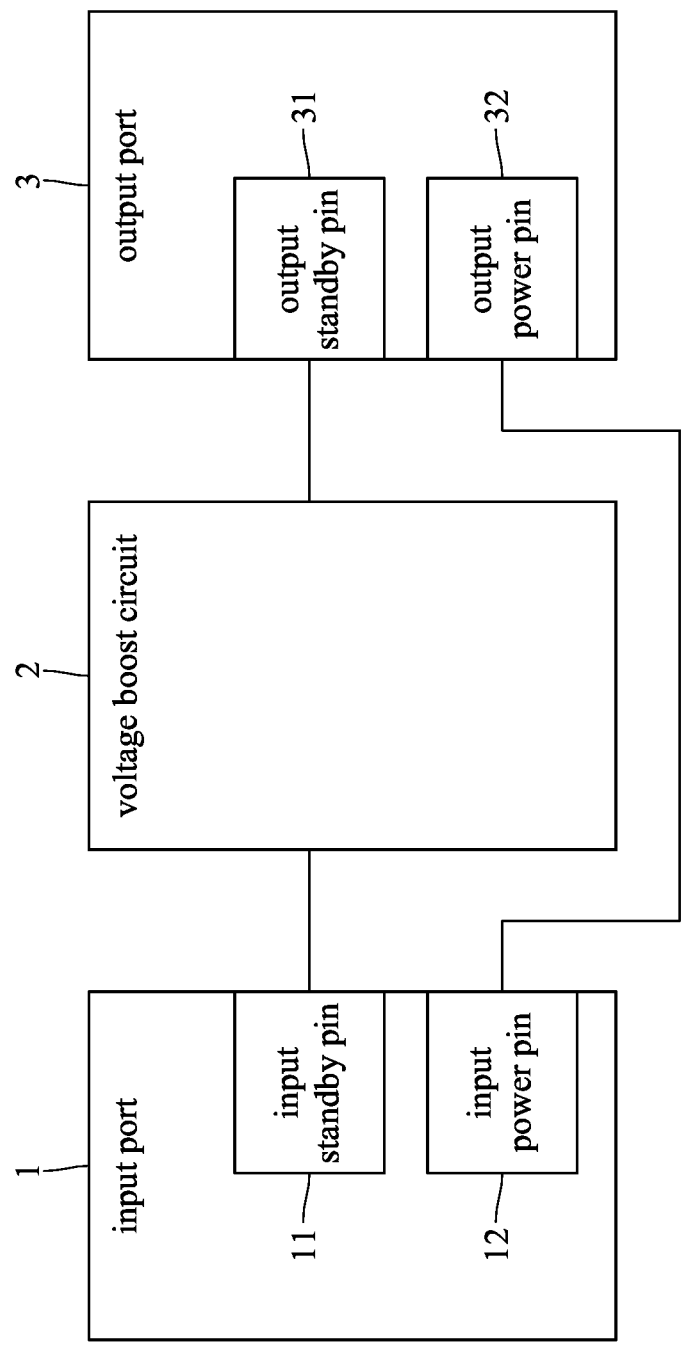
FIG. 1 is a block diagram of the power converting device for power supply of an embodiment of the present disclosure.

Please refer to FIG. 1, which shows the block diagram illustrating the power converting device for power supply of an embodiment of the disclosure, wherein the power converting device of this embodiment comprises an input port 1, a voltage boost circuit 2 and an output port 3. The input port 1 has an input standby pin 11 and an input power pin 12. The input standby pin 11 is configured to transmit a first power signal having a first voltage value, and the input power pin 12 is configured to transmit a second power signal having a second voltage value. The voltage boost circuit 2 electrically connects to the input standby pin 11 and is configured to receive and convert the first power signal having the first voltage value into the first power signal having the second voltage value. The output port 3 has an output standby pin 31 and an output power pin 32. The output standby pin 31 electrically connects to the voltage boost circuit 2 to receive the first power signal having the second voltage value. Instead of connecting to the voltage boost circuit 2, the output power pin 32 electrically connects to the input power pin 12 to receive the second power signal having the second voltage value, which bypasses the voltage boost circuit 2.

Figure 2:
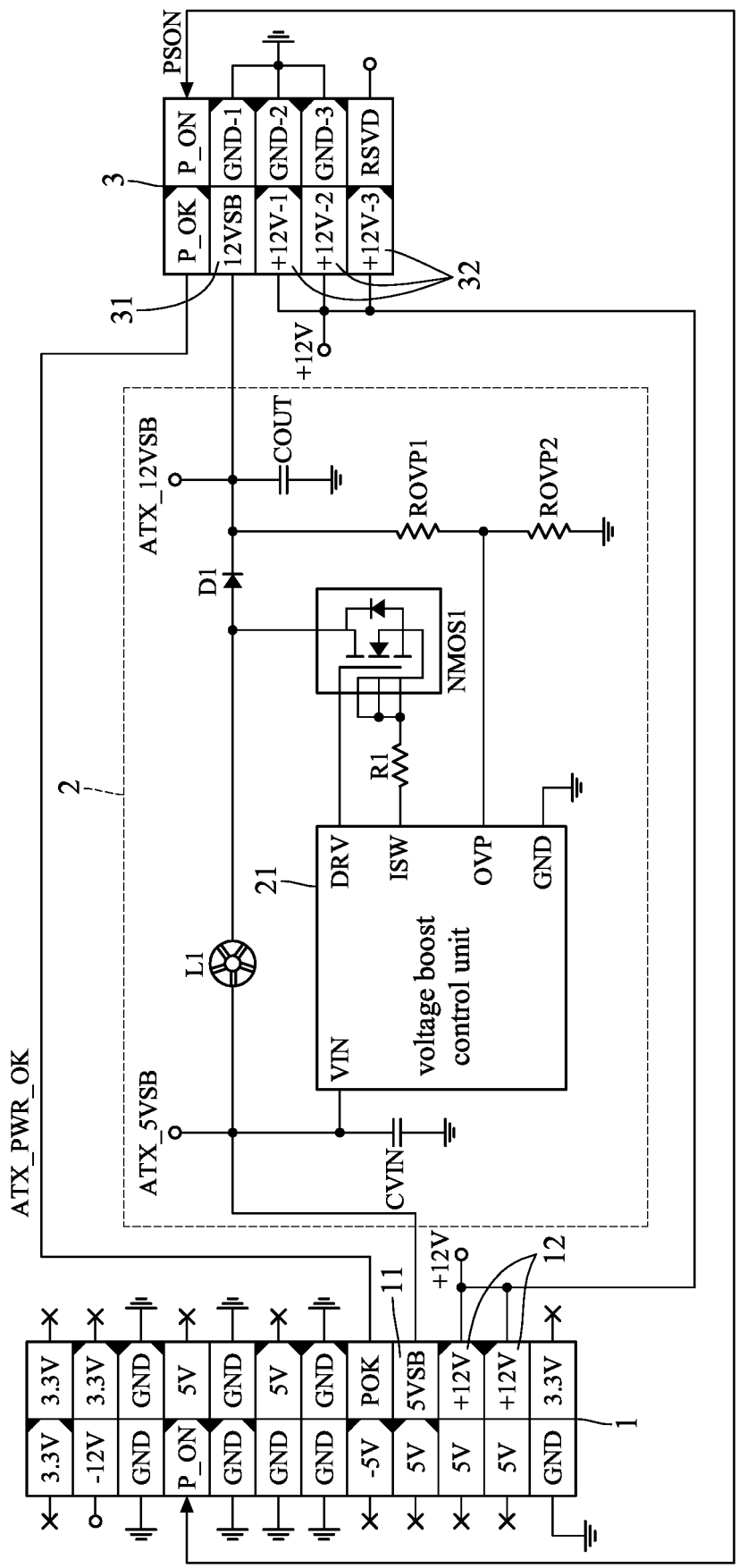
FIG. 2 is a circuit diagram of the power converting device for power supply of an embodiment of the present disclosure.

The input port 1 of an embodiment of the disclosure may connect to a power supply, especially the power supply having a connecting port adapting the ATX12V standard. In such example, the input port 1 may have 24 pins, and such pins comprise the input standby pin 11 and the input power pin 12. As shown in FIG. 2 showing a circuit diagram of the power converting device for power supply of an embodiment of the present disclosure, the input standby pin 11 may be the "SVSB" pin in FIG. 2, and the input power pin 12 may be the "+12V" pin in FIG. 2, but the present disclosure does not limit the respective amount of the input standby pin 11 or the input power pin 12. Output port 3 may have 10 pins, and such pins comprise the output standby pin 31 and the output power pin 32. As shown in FIG. 2, the output standby pin 31 may be the "12VSB" pin in FIG. 2, and the output power pin 32 may be the "+12V−1" pin, "+12V−2" pin or "+12V−3" pin in FIG. 2, but the present disclosure does not limit the respective amount of the output standby pin 31 or the output power pin 32. The present disclosure aims to convert the first signal having the first voltage value into the first signal having the second voltage value by the voltage boost circuit 2 connecting with the input standby pin 11 and the output standby pin 31 respectively, wherein the second voltage value is higher than the first voltage value. For instance, the first voltage value may be 5V and the second voltage value may be 12V.

Please note that the circuit diagram of FIG. 2 is merely an example of implementing the voltage converting device of the present disclosure, thus the circuit in practice is not limited thereto. The input port 1 under the ATX12V standard and the output port 3 under the ATX12OV standard shown in FIG. 2 are merely adapted as an example, and such input port 1 has 24 pins whose functions are also shown in this figure. Since details in these pins are well known to one skilled in the art, related descriptions thereto are thus omitted. Specifically, the respective pins of the input port 1 and the output port 3 may have a plurality of data pins configured to transmit digital data, such as a power good pin P_OK, a power start pin P_ON or the like. The power good pin P_OK and the power start pin P_ON of input port 1 may respectively transmit a power good signal ATX_PWR_OK to the P_OK pin of the output port 3 and a power start signal PSON to the P_ON pin of the output port 3, bypassing the voltage boost circuit 2. Besides, the input power pin (two +12V pins) of the input port 1 may directly receive and transmit a +12V signal to the output power pin 32 (+12V−1 pin, +12V−2 pin and +12V−3 pin) of the output port 3. The −12V pin of the input port 1 may directly receive and transmit a −12V signal to a RSVD pin of the output port 3. Except for the pins above, most pins of the input port 1 do not connect to the output port 3, and only the SVSB pin (i.e. the input standby pin 11) electrically connects to the 12VSB pin (i.e. the output standby pin 31) of the output port 3 via the voltage boost circuit 2. By such connecting structure, the output port 3 under the ATX12VO standard merely receives signals with digital data or with a voltage of ±12V. In this way, the output port 3 may provide the power of +12V, and provide the low-power DC power of +12V via the 12VSB pin when all the other voltage channels are cut off.

Specifically, the voltage boost circuit 2 is further explained in the following. Please continue to refer to FIG. 2. The voltage boost circuit 2 comprises a voltage boost control unit 21 comprising a voltage input end VIN, a driving end DRV, a control end ISW, an overvoltage protection end OVP and a ground end GND. The voltage input end VIN electrically connects to the input standby pin 11 and a capacitor CVIN. The driving end DRV and the control end ISW are configured to control a switch NMOS1 to be turned on or turned off. The overvoltage protection end OVP connects to ground via an overvoltage protection resistance ROVP2, and electrically connects to the output standby pin 31 via an overvoltage protection resistance ROVP1. In addition, the input standby pin 11 connects to the output standby pin 31 and a capacity COUT via an inductance L1 and a diode D1 respectively. In sum, the voltage boost circuit 2 boosts the first power signal having the first voltage value into the first power signal having the second voltage value and outputs it to the output standby pin 31. Furthermore, with the overvoltage protection end OVP, the voltage boost circuit 2 adds the overvoltage protection function to the basic booster in order to prevent the output standby pin 31 from damages caused by a surge.

In the embodiment above, by practicing the voltage converting device of the present disclosure, the existing power supply under the ATX12V standard may be therefore connect to a baseboard under the ATX12VO standard. Thus, even if customers purchase a baseboard under the new standard, the power supply under the old standard may still be utilized rather than being replaced with a power supply under new standard.

In view of the above description, the power converting device for power supply of an embodiment of the disclosure boosts the first power signal having the first voltage value received from the input standby pin into the first power signal having the second voltage value, thereby the output port receives the first power signal having the second voltage value and the second power signal having the second voltage value. Therefore, even though the power supply and the powered hardware are under different specification standard, it is possible for them to operate normally by interconnecting via the voltage converting device of the present disclosure.

What is claimed is:

1. A power converting device for power supply, comprising:
   an input port having an input standby pin and an input power pin, with the input standby pin configured to transmit a first power signal having a first voltage value and the input power pin configured to transmit a second power signal having a second voltage value;
   a voltage boost circuit, electrically connecting to the input standby pin, receiving and converting the first power signal having the first voltage value into the first power signal having the second voltage value; and
   an output port having an output standby pin and an output power pin, with the output standby pin electrically connecting to the voltage boost circuit to receive the first power signal having the second voltage value, and with the output power pin electrically connecting to the input power pin to receive the second power signal having the second voltage value,
   wherein the second voltage value is higher than the first voltage value.

2. The power converting device for power supply of claim 1, wherein the voltage boost circuit comprises a voltage boost control unit comprising a voltage input end, a driving end, a control end, an overvoltage protection end and a ground end,
   wherein the voltage input end electrically connects to the input standby pin, the driving end electrically connects to the output standby pin via a switch, and the overvoltage protection end electrically connects to the output standby pin via an overvoltage protection resistance.

3. The power converting device for power supply of claim 1, wherein the first voltage value is 5 volts.

4. The power converting device for power supply of claim 1, wherein the second voltage value is 12 volts.

5. The power converting device for power supply of claim 1, wherein the input port has 24 pins comprising the input standby pin and the input power pin.

6. The power converting device for power supply of claim 1, wherein the output port has 10 pins comprising the output standby pin and the output power pin.

7. The power converting device for power supply of claim 1, wherein the input port has an input data pin and the output port has an output data pin, and the input data pin electrically connects to the output data pin to transmit a signal with digital data.

* * * * *